United States Patent
Rao et al.

(10) Patent No.: US 8,135,717 B2
(45) Date of Patent: Mar. 13, 2012

(54) PROCESSOR FOR FAST CONTEXTUAL MATCHING

(75) Inventors: Ramana B. Rao, San Francisco, CA (US); Swapnil Hajela, Fremont, CA (US); Nareshkumar Rajkumar, San Jose, CA (US)

(73) Assignee: SAP America, Inc., Newtown Square, PA (US)

( * ) Notice: Subject to any disclaimer, the term of this patent is extended or adjusted under 35 U.S.C. 154(b) by 473 days.

(21) Appl. No.: 12/414,581

(22) Filed: Mar. 30, 2009

(65) Prior Publication Data

US 2009/0193005 A1    Jul. 30, 2009

Related U.S. Application Data

(63) Continuation of application No. 11/391,890, filed on Mar. 29, 2006, now Pat. No. 7,516,125.

(60) Provisional application No. 60/704,358, filed on Aug. 1, 2005.

(51) Int. Cl.
    *G06F 7/00* (2006.01)
(52) U.S. Cl. ......................... 707/741; 707/742
(58) Field of Classification Search .................. 707/741, 707/742, 759, 700, 705, 706, 736, 999.003–999.005; 715/530; 704/1, 9
    See application file for complete search history.

(56) References Cited

U.S. PATENT DOCUMENTS

| | | | |
|---|---|---|---|
| 5,265,065 A * | 11/1993 | Turtle | 1/1 |
| 5,418,948 A * | 5/1995 | Turtle | 707/700 |
| 5,704,060 A | 12/1997 | Del Monte | |
| 5,778,361 A * | 7/1998 | Nanjo et al. | 1/1 |
| 6,006,221 A * | 12/1999 | Liddy et al. | 1/1 |
| 6,654,717 B2 | 11/2003 | Loofbourrow et al. | |
| 6,735,583 B1 * | 5/2004 | Bjarnestam et al. | 1/1 |
| 7,149,748 B1 * | 12/2006 | Stephan | 707/742 |
| 7,512,596 B2 * | 3/2009 | Hajela et al. | 1/1 |
| 7,783,476 B2 * | 8/2010 | Yang | 704/10 |
| 2001/0039565 A1 | 11/2001 | Gupta | |
| 2001/0044720 A1 | 11/2001 | Lee et al. | |
| 2003/0069880 A1 * | 4/2003 | Harrison et al. | 707/3 |
| 2004/0230598 A1 | 11/2004 | Robertson et al. | |
| 2005/0060651 A1 * | 3/2005 | Anderson | 715/530 |

(Continued)

FOREIGN PATENT DOCUMENTS

WO    WO-2008119129 A1    10/2008

OTHER PUBLICATIONS

"Fast Phrase Querying With Combined Indexes", ACM Journal Name, vol. V, No. N, Month 200yy, pp. 1-21.*

(Continued)

*Primary Examiner* — Hung T Vy
(74) *Attorney, Agent, or Firm* — Mintz, Levin, Cohn, Ferris, Glovsky and Popeo, P.C.

(57) ABSTRACT

Words having selected characteristics in a corpus of documents are found using a data processor arranged to execute queries. Memory stores an index structure in which entries in the index structure map words and marks for words having the selected characteristics to locations within documents in the corpus. Entries in the index structure represent words and other entries represent marks with the location information of a marked word. The entries for the marks can be tokens coalesced with prefixes of respective marked words or adjacent. A query processor forms a modified query by adding a mark for a word to the query. The processor executes the modified query.

21 Claims, 5 Drawing Sheets

U.S. PATENT DOCUMENTS

| | | | |
|---|---|---|---|
| 2006/0031207 A1* | 2/2006 | Bjarnestam et al. | 707/3 |
| 2006/0167872 A1* | 7/2006 | Parikh | 707/6 |
| 2007/0067437 A1 | 3/2007 | Sindambiwe | |
| 2007/0124475 A1 | 5/2007 | Syed et al. | |

OTHER PUBLICATIONS

Contributors to the Dictionary of Algorithms and Data Structures, Nist, Black, P.E., ed., http://www.nist.gov/dads/Other/contrib.html (1-3) Jun. 27, 2005.

Author(s), "inverted index," Dictionary of Algorithms and Data Structures, Nist, Black, P.E., ed., http://www.nist.gov/dads/HTML/InvertedIndex.html (1-2) Jun. 27, 2005.

Author(s), "prefix," Dictionary of Algorithms and Data Structures, Nist, Black, P.E., ed., http://www.nist.gov/dads/HTML/prefix.html Jun. 27, 2005.

Author(s), "suffix," Dictionary of Algorithms and Data Structures, Nist, Black, P.E., ed., http://www.nist.gov/dads/HTML/prefix.html Jun. 27, 2005.

CRC-A, "suffix array," Dictionary of Algorithms and Data Structures, Nist, Black, P.E., ed., http://www.nist.gov/dads/HTML/suffix.html Jun. 27, 2005.

Williams, H.E. et al., "Fast Phrase Querying With Combined Indexes," ACM Transactions of Information Systems, vol. 22, No. 4, pp. 573-594 Oct. 2004.

"Understanding Query Expressions," Oracle Con Text Option Application Developer's Guide, Re. 3, http://www.lsbu.ac.uk/oracle/oracle7/server/doc/CO20APP/ch03.htm (1-47) Jun. 8, 2005.

Scholer, F. et al., "Fast Phrase Querying With Combined Indexes," presentation by Search Engine Group, RMIT Univ Computer Science.

Williams, H.E. et al., "Fast Phrase Querying With Combined Indexes," presentation by Search Engine Group, RMIT Univ. Computer Science.

Bahle, D. et al., "Efficient Phrase Querying with an Auxiliary Index," School of Computer Science and Information Technology, RMIT Univ., Melbourne, AU, 7 pp. 2001.

Extended European Search Report dated Sep. 21, 2011, issued by the European Patent Office for corresponding European Patent Application No. 10158235.1.

Williams, et al., "Fast Phrase Querying with Combined Indexes", ACM Transactions on Information Systems, vol. 22, No. 4, Oct. 2004.

Bahle, et al., "Efficient Phrase Querying with an Auxiliary Index", Retrieved from the Internet: <URL:http://citeseer.ist.psu/cache/papers/cs/26288/http://zSzzSzwww.cs.rmit.edu.auzSzjzzSzfulltextzStsigir02bwz.pdf/bahle02efficient.pdf> [retrieved on Mar. 28, 2007].

Williams, et al., "What's Next? Index Structures for Efficient Phrase Querying", Proceedings of the 10th Australasian Database onference, Auckland, New Zealand, Jan. 18, 1999.

Moffat, et al., "Text compression for dynamic document databases", IEEE Transactions on Knowledge and Data Engineering IEEE USA, vol. 9, No. 2, Mar. 1997.

Extended European Search Report dated Oct. 7, 2011, issued by the European Patent Office, in connection with corresponding European Patent Application No. 06788649.9.

Faloutsos, "Access Methods for Text", ACM Computing Surveys, vol. 17, No. 1, Mar. 1, 1985.

Extended European Search Report dated Sep. 29, 2011, issued by the European Patent Office, in connection with corresponding European Patent Application No. 06788499.9.

\* cited by examiner

Fig. 1

DOCUMENT 1.

The[1] University[2] of[3] Alabama[4] is[5] quite[6] a[7] huge[8] college[9].

Fig. 2

DOCUMENT 2.

The[1] Guns[2] of[3] Navarone[4] is[5] a[6] classic[7].

PROCESSOR FOR FAST CONTEXTUAL MATCHING

CROSS-REFERENCE TO RELATED APPLICATION

This application is a continuation of U.S. patent application Ser. No. 11/391,890 filed Mar. 29, 2006, now U.S. Pat. No. 7,516,125, which claims the benefit of U.S. Provisional Application No. 60/704,358 filed Aug. 1, 2005, the contents of which are incorporated by reference.

BACKGROUND OF THE INVENTION

1. Field of the Invention

The present invention relates to search engines for handling contextual queries over a set of documents.

2. Description of Related Art

Search engines often include features that allow a user to find words in specific contexts. For example, words used in a common field (abstract, title, body, etc.) in documents that make up the corpus being searched are often subject of queries. Some search engines are set up to search for words used in grammatical contexts, such as subjects or objects in sentences. For documents written in markup languages, such as XML or HTML, words used that are parts of tags can be searched for using search engines. Search engines have also been implemented to search for words used as part of an entity name, like the name of a person, place or product.

Also, search engines routinely encounter the problem of handling very frequent words independent of context, referred to as stopwords. Stopwords like "the", "of", "and", "a", "is", "in" etc., occur so frequently in the corpus of documents subject of a search index that reading and decoding them at query time becomes a very time-consuming operation. Most search engines therefore drop these words during a keyword query and hence the name "stopwords." However, for a search engine to support phrase queries, these stopwords must be evaluated. As an example, consider a phrase query like "University of Georgia". This query must return with documents matching all the three words in the same order. Therefore, the search engine must deal with the stopword "of".

In a survey of web server search logs, it has been found that 20% of all phrase queries contain a frequently occurring word like "the", "to", "of" etc. Thus, solving this issue of phrase query performance is paramount to any search engine. Likewise, contextual searching occupies a significant proportion of the queries for many types of search engines.

Performance of phrase queries and other contextual searches presents serious challenges indexes used for various searchable contexts and for stopwords occupy a significant percentage of the search index data on disk. This taxes system performance in 3 ways:

Disk performance on large disk reads from the indexes becomes a serious bottleneck.

System processor performance in decompressing this data fetched from the indexes gets impacted.

System memory usage is also increased.

Different methodologies can be used to speed up phrase queries. One method is to use specialized indexes called skiplists that allow selective access of the index postings. This method has the unfortunate side effect of further increasing both the index size and the complexity of the indexing engine.

Another technique that can be used for stopwords is called "next word indexing". In this technique, words following stopwords are coalesced with the stopword into one word and stored as a separate word in the index. For instance, in the sentence fragment "The Guns of Navarone" in a document, making an index entry by coalescing the stopwords and their subsequent words creates the new words "TheGuns" and "ofNavarone". These words are stored separately in the index. For a phrase query "The Guns of Navarone", the search engine converts the four-word query into a 2-word phrase query "TheGuns of Navarone". The speed up is enormous here as the number of postings for the word "TheGuns" and "ofNavarone" will be quite small when compared to that for the words "The" and "of".

There is a mechanism of "next-word" indexes (also referred as Combined 30 indexes) published by Hugh E. Williams, Justin Zobel, Dirk Bahle, "Fast Phrase Querying with Combined Indexes," Search Engine Group, School of Computer Science and Information Technology, RMIT University, GPO Box 2476V, Melbourne 3001, Australia. 1999.

This next-word indexing technique, though very interesting, is not preferable because it can increase the number of unique words in the search engine by more than a few million entries. This creates slowdowns both in indexing and querying.

Traditionally contextual matching requires multiple index structures over the documents which consume significant resources. The problem is exacerbated when complex matching is needed, over several contextual parameters and stopwords.

It is desirable to provide systems and methods for speeding up the indexing and querying processes for search engines, and to otherwise make more efficient use of processor resources during indexing and querying large corpora of documents.

SUMMARY OF THE INVENTION

The present invention provides a method and system for contextual matching based on preprocessing a corpus to insert marks on words, and in some embodiments, coalescing the mark with a prefix, such as the first letter, from the marked word to create a specialized internal token. The marks identify a characteristic of the marked word, such as a context for the word. Thus the input corpus is can be represented by a sequence of arbitrary tokens, many of which may indeed represent actual words in a human language. Other than these "words," other tokens represent "marks" that apply to the adjacent word(s). These marks represent other features of the words, including contextual features, determined during preprocessing or to constrain the words to a particular context.

For example, in the sentence fragment "The Guns of Navarone", indexing can treat the stopwords as marks and thus index internal tokens "TheG" and "ofN" with the same positional information as the stopwords, "The" and "of", thus facilitating matching of these stopwords in the context of words beginning with a prefix letter. More than one mark can also be associated with one word in a document, if desired, for example each of the words can be marked as being part of the title of a document. The special internal tokens are stored as part of the index in a manner that disambiguates them from normal words. Now, when the same phrase is entered as a query, the query is modified for searching to the modified phrase "TheG title_G Guns ofN title_N Navarone". The speedup in searching is enormous here as the size of the data for "TheG", "ofN", "title G" and "title N" is smaller as compared to that of "The", "of", Guns and Navarone, respectively.

An apparatus for contextual matching on the corpus of documents is described that comprises a data processor arranged to execute queries to find terms in context in the corpus of documents. Memory readable by the data processor stores an index structure. The index structure maps entries in the index structure to documents in the corpus. The entries in the index structure represent words by for example including tokens that identify the corresponding words, where the term "word" used herein refers to characters and character strings whether or not they represent a proper word in a linguistic sense, found in the corpus of documents and indexed by the index structure. In addition, some entries in the index structure represent marks on words found in the corpus. Entries that represent marks on words comprise tokens coalesced with prefixes of respective marked words. The prefixes comprise one or more leading characters of the respective marked words. The entries representing marks on words preferably include specialized tokens' with disambiguating features, to distinguish them from tokens representing words found in the corpus. The data processor includes a query processor which forms a modified query by adding to or substituting for a word in a subject phrase with a search token representing a mark coalesced with a prefix of the marked word in the subject phrase. The processor executes the modified query using the index structure, and returns results comprising a list of documents that satisfies the query, and optionally locations within the documents for the phrases that satisfy the query.

In embodiments of the system, the prefixes that are coalesced with a mark comprise the leading N characters of the marked word, where N is three or less. Substantial improvements in performance are achieved where N is equal to one. Typically, tokens are made using a mark coalesced with the leading N characters of the next word or preceding word, where the next word or preceding word includes more than N characters, so that the prefix does not include all of the adjacent word.

Representative embodiments create special tokens for the coalesced marks by combining code indicating characters in the mark with code indicating characters in the prefix, and a code indicating that the entry is a coalesced entry that disambiguates the entry from normal words.

An apparatus for indexing a corpus of documents is described as well, which creates and maintains the index structure described above. Thus, a system comprising a data processor arranged to parse documents in the corpus of documents to identify words and locations of words found in the documents, and mark words according to a preselected set of marks, in the documents is described. The processor creates and/or maintains an index structure including entries representing words found in the corpus of documents and mapping entries in index structure to locations in documents in the corpus. The apparatus includes memory storing the index structure that is writable and readable by the data processor. An indexing processor is also included that identifies words in context in a set of words found in the documents in the corpus. For words identified in context or in contexts in the documents, entries are added to the index structure representing the marks for the words, including tokens coalesced with prefixes of respective marked words, as described herein.

Data processing methods are provided which include storing an index structure as described above on a medium readable by a data processor, modifying an input phrase query to form a modified phrase query by adding to or substituting for a word found in a subject phrase, a search token representing the mark coalesced with the prefix of the marked word in the subject phrase, and executing the modified query. Likewise, data processing methods are provided which include parsing documents in the corpus of documents to identify words and locations of words in the documents, and to create entries in an index structure as described herein. The index structure is stored in memory writable and readable by the data processor. A set of word characteristics are identified that are desirable for matching with the query processor, and marks provided for the word characteristics in the set. Words identified to have a characteristic, such as context, in the set of word characteristics are found in the documents in the corpus, and entries are added to the index structure representing the marks, by including tokens for the words coalesced with prefixes as described herein.

The technology described herein can also be implemented as an article of manufacture comprising a machine readable data storage medium, storing programs of instructions executable by a processor for performing the data processing functions described herein.

Other aspects and advantages of the present invention can be seen on review of the drawings, the detailed description and the claims, which follow.

DETAILED DESCRIPTION

A detailed description of embodiments of the present invention is provided with reference to the FIGS. 1-6.

Figure 1:
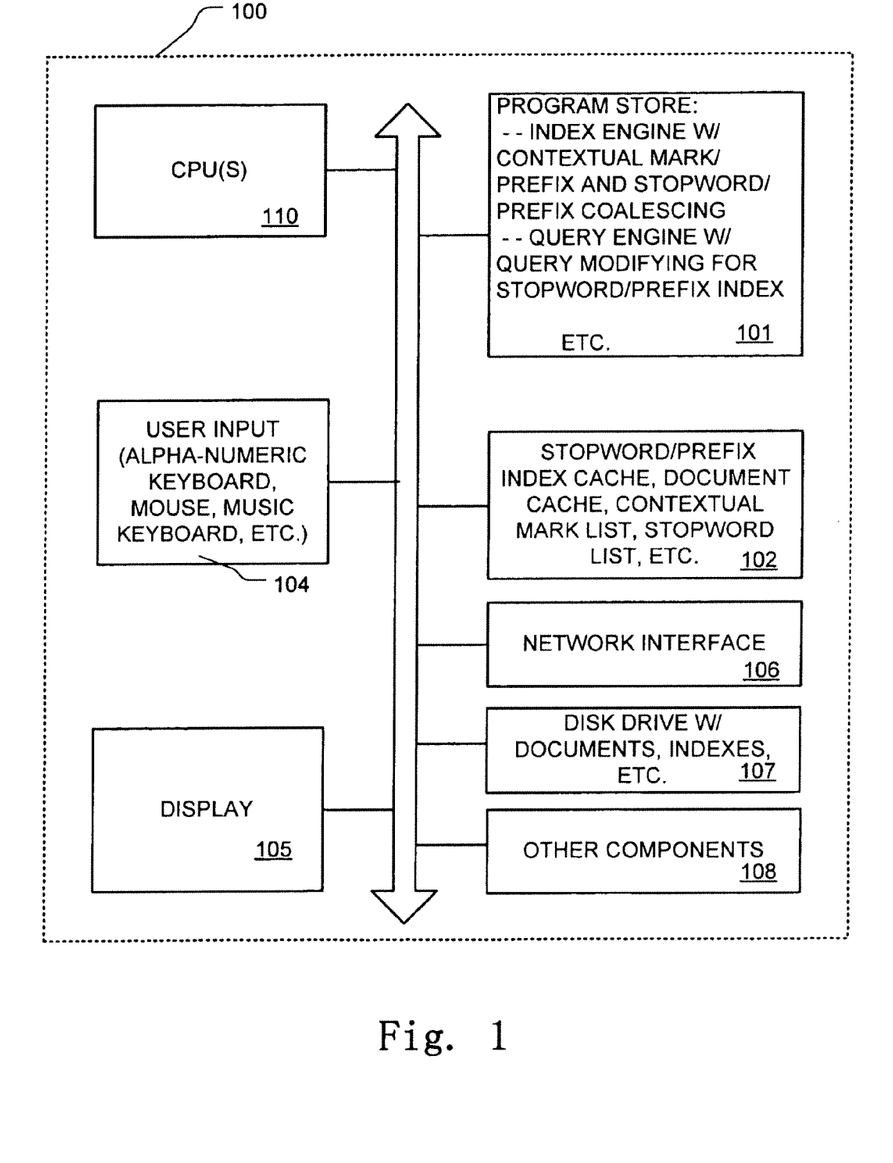
FIG. 1 is a simplified block diagram of a computer system arranged as an apparatus for finding phrases in a corpus of document.

FIG. 1 is a simplified block diagram representing a basic computer system 100 configured as a search engine dedicated to the search and retrieval of information for the purpose of cataloging the results. The search engine includes a document processor for indexing and searching a corpus of documents for finding phrases, including data processing resources and memory storing instructions adapted for execution by the data processing resources. The data processing resources of the computer system 100 include one or more central processing units CPU(s) 110 configured for processing instructions, program store 101, data store 102, user input resources 104, such as an alpha-numeric keyboard, a mouse, and so on, a display 105, supporting graphical user interfaces or other user interaction, a network interface 106, a mass memory device 107, such as a disk drive, or other non-volatile mass memory, and other components 108, well-known in the computer and document processing art. The program store 101 comprises a machine-readable data storage medium, such as random access memory, nonvolatile flash memory, magnetic disk drive memory, magnetic tape memory, other data storage media, or combinations of a variety of removable and non-removable storage media. The program store 101 stores computer programs for execution by the CPU(s) 110, configuring the computer system as a search engine. Representative programs include an index processor for generating and maintaining an index structure with entries using tokens made by mark/prefix coalescing, including stopword/prefix coalescing. The program store also includes a query processor including resources for modifying queries for use of the token mark/prefix coalescing in the index structure. The data store 102 comprises a machine-readable data storage medium configured for fast access by the CPU(S) 110, such as dynamic random access memory, static random access memory, or other high speed data storage media, and stores data sets such as a stop word lists, mark lists and data structures such as an index cache and a document cache, utilized by the programs during execution. The mass memory 107 comprise's non-volatile memory such as magnetic disk drives and the like, and stores documents from a corpus of documents, indexes used by the search engine, and the like.

For a corpus of documents, a stopword list is defined, including common words (e.g., prepositions and articles) that usually have little or no meaning by themselves. In the English language examples include "a", "the", "of" etc. Stopword lists may be defined by linguistic analysis independent of a corpus of documents, or alternatively defined by analysis of a corpus of documents to identify the most commonly used words. The size of the stopword list can be adjusted according to the needs and use of a particular search engine. For electronic documents including tags delineated by special characters such as "<" and ">", a special character or combination of special characters could be treated as a stopword, and included in a stopword list.

Also, for a corpus of documents, a list of other types of marks is defined, including marks that represent contexts that are chosen as suits a particular application of the search engine, and the nature of the corpus of documents. Representative marks include contextual marks for document fields, contextual marks for words used in entity names, contextual marks for words used in grammatical contexts, contextual marks for words used as tags or as parts to tags in electronic documents, and so on. The number of marks and the types of marks can be adjusted according to the needs and use of the particular search engine.

Figure 2:
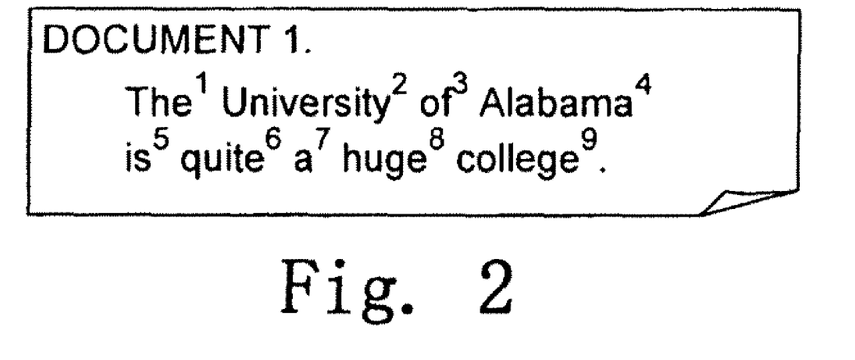
FIG. 2 illustrates an example document.
Figure 3:
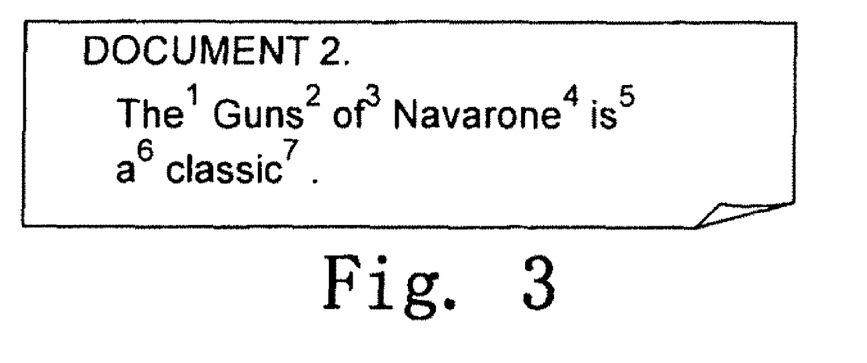
FIG. 3 illustrates another example document.
Figure 4:
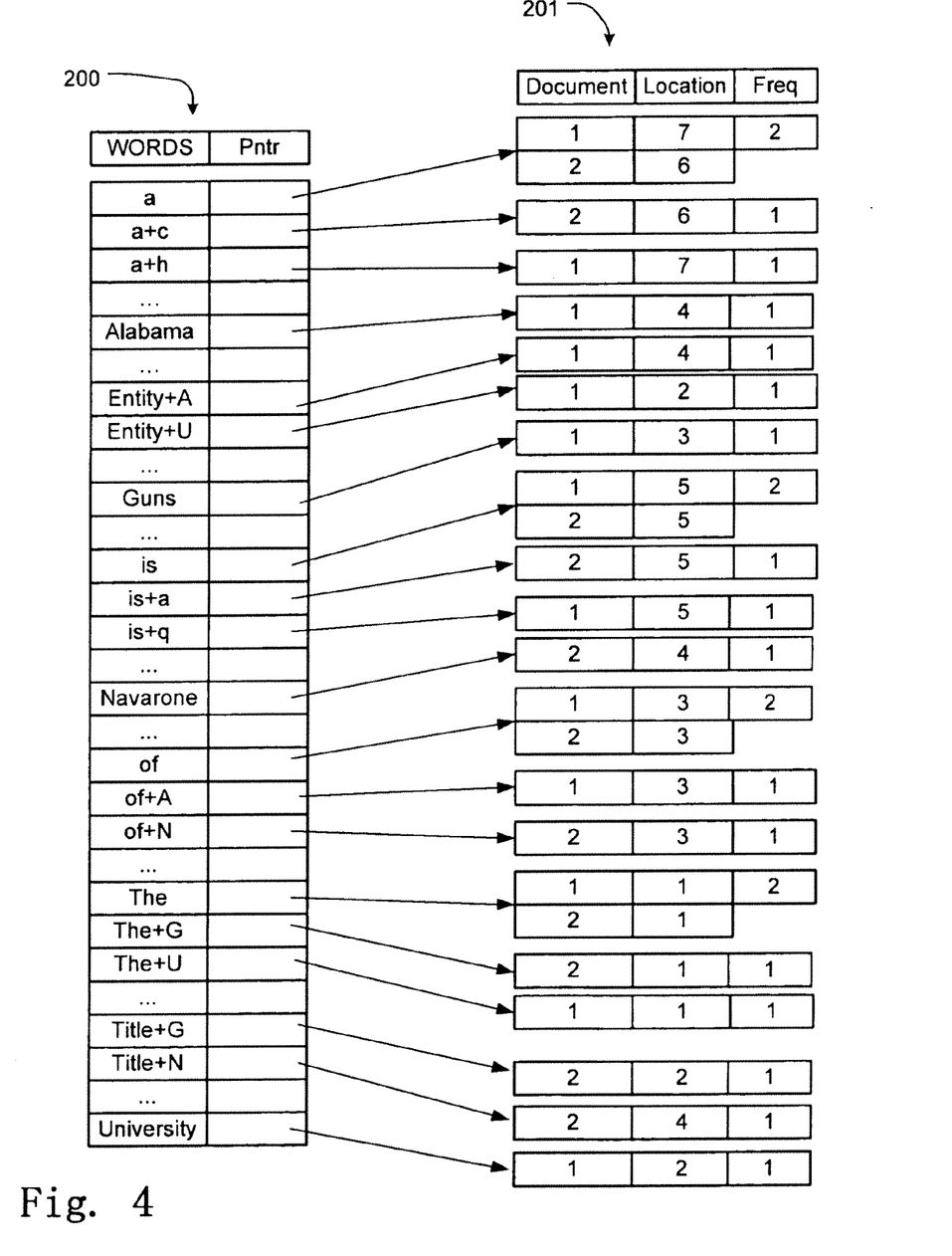
FIG. 4 illustrates an index structure with contextual and stopword marks coalesced with prefixes of next words.

FIGS. 2-4 illustrate example documents and an index structure comprising a reverse index and dictionary with marks including stopwords for the example documents.

FIGS. 2 and 3 represent two documents in a corpus for the search engine. Document 1, illustrated in FIG. 2, contains the text "The University of Alabama is quite a huge college" and Document 2, illustrated in FIG. 3, contains the text "The Guns of Navarone is a classic." The superscripts (1-9 in Document 1 and 1-7 in Document 2) indicate the locations of the words in the respective documents.

A corpus of documents for a search engine can comprise a collection of documents represented by a dictionary/index structure. A corpus of documents can include documents stored on a single disk drive, documents accessible by a local network, documents in a library, documents available via a public network, documents received at a search engine from any source, or other collections associated by the index structure of the search engine, or accessible for the purposes of generating such structures. Documents include web pages, or other electronic documents, expressed in languages such as HTML and XML, text files expressed in computer languages such as ASCII, specialized word processor files such as ".doc" files created by Microsoft Word, and other computer readable files that comprise text to be indexed and searched.

FIG. 4 illustrates an index structure comprising a dictionary 200 and a reverse index 201 (also called an inverted index). The dictionary 200 contains entries representing all the unique words and marks in the index. The entries include tokens identifying the words and the marks, where the tokens comprise computer readable codes, such as ASCII characters for the letters in the words and the marks. The entries also included pointers to the locations of the data for the words and for the marks in the inverted index. The dictionary 200 and reverse index structure 201 are partially filled to simplify the drawing.

For each entry in the dictionary 200, the reverse index 201 contains the document number or numbers identifying documents in the corpus, and the location or locations of words, the location or locations of words corresponding with, or marked by, marks, in the corresponding documents. In some embodiments, the index includes a parameter for each entry indicating the frequency of the word in the corpus, or alternatively, a parameter set for each entry indicating the frequency of the word in the corresponding documents.

The phrase, "University of Alabama", is an entity name; and the phrase, "Guns of Navarone"; is a title. Thus, the words "University" and "Alabama" are processed during parsing, and identified as having the characteristic of being in an entity name context. The words "Guns" and "Navarone" are processed during parsing, and identified as having the characteristic of being in r a title context. Tokens for the marks on "University", such as "entity+U" and for the mark on "Alabama", such as "entity+A" are added to the index with the same location data as the entries for the words "University" and "Alabama", respectively. Also, entries including the tokens for the marks on "Guns" and "Navarone", such as "title+G" and "title+N", are added to the index with the same location data as the entries for the words, "Guns" and "Navarone", respectively.

The stopwords "a", "is", "the", "of" are processed further for the dictionary and reverse index. In particular, entries are included in the dictionary comprising artificial tokens formed by coalescing the stopwords with a first character, or prefix of length N characters, from the respective next words in the document. In the example, a token is added to the entry for the stopword "a", by using the stopword coalesced with a prefix comprising the first character of respective next words "classic" from Document 2, and "huge" from Document 1. Likewise, the tokens for stopword "of" are made by coalescing the stopword with a prefix comprising a first character of the respective next words "Alabama" from Document 1, and "Navarone" from Document 2. The stopword "is" is coalesced with a prefix comprising a first character of the respective next words "a" from Document 1, and "quite" from Document 2 to make tokens for corresponding entries. The stopword "The" is coalesced with a prefix comprising a first character of the respective next words "Guns" from Document 2, and "University" from Document 1 to make tokens for corresponding entries.

The tokens may comprise the stopword concatenated with a disambiguating feature, such as a character or character string (for example, a "+" symbol as shown here), or mark which may or may not include a disambiguating feature, concatenated with the prefix of the next word. In other embodiments the disambiguating feature may comprise a string of codes for letters such as for the letters "xxzz", or a string of letters and punctuation such as "x#@Xz".

The length N of the prefix is 1 in a preferred embodiment. In other embodiments, the length N is 2. In yet other embodiments the length N is 3. Further, the length N can be made adaptive, so that it is adapted for different stopwords in the same corpus or for efficient performance across a particular corpus. It is unlikely that prefixes of length greater than 3 will be required for performance improvements for corpora having sizes expected in the reasonable future. Although embodiments described here apply coalescing with the prefix of a next word or a marked word, some special characters treated as stopwords, for example, could be coalesced with a prefix of a previous word. For example, a closing character, such as punctuation like a close quotation mark, or a ">" which delineates the end of a tag in some markup languages, can be coalesced with a prefix of a previous word for the purpose on indexing and searching.

If the next word has fewer characters than N, then the entire next word is concatenated with the disambiguating symbol and the first word. Typically, the next word includes more than N characters. Also, if a stopword appears at the end of a sentence or is otherwise hanging, the stopword can be coalesced with the following punctuation (e.g., a period or semicolon) or with other characterizing data suitable for searching.

As can be seen from this small example, the entries comprising coalesced tokens distribute the data for the marks, and aid in fast querying.

In the illustrated embodiment, the coalesced tokens are combined with normal words in a single "flat" dictionary with a reverse index for locating words corresponding to the entries in the dictionary in specific documents. Other embodiments include providing one or more additional dictionary/index pairs for the coalesced stopwords, accessed only for phrase queries including stop words. The index structure can be configured in a wide variety of ways, depending on the corpus being analyzed, the characteristics of searches being used, the memory availability of the search engine, the speed requirements, and so on, In embodiments of the invention, the index structure may comprise a skiplist.

An index processor in the search engine which comprises data sets, such as stopword lists, mark lists and a cache of documents in a corpus, data structures such as reverse index structures, and computer instructions executable by a processing unit, analyzes a document corpus and generates a dictionary and index such as that illustrated in FIG. 4. The index processor may perform the analysis over a set of documents in one processing session, and may analyze one document, or a part of a document, at a time as such document is added to the corpus.

Figure 5:
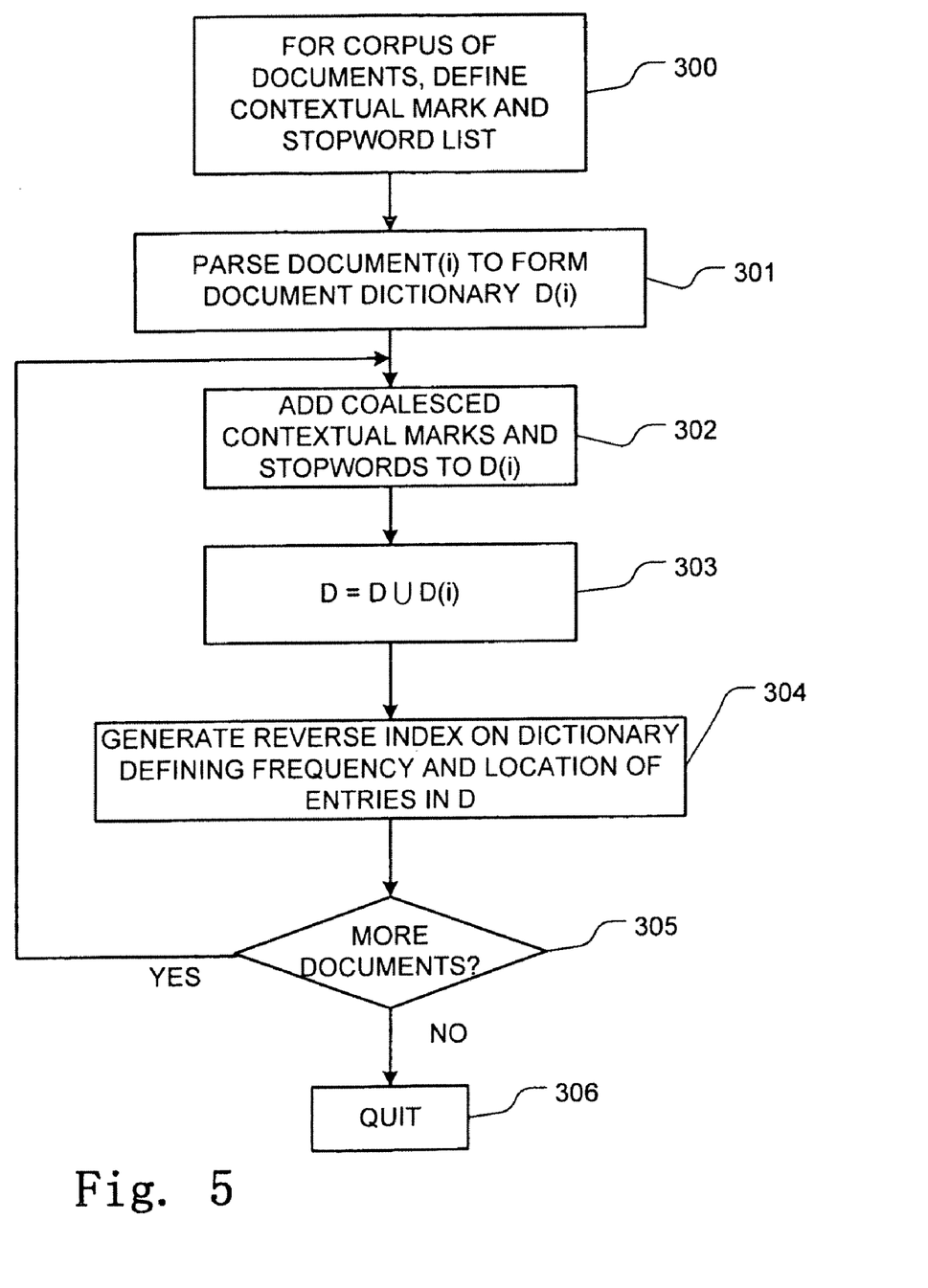
FIG. 5 is a simplified flow chart for an index processor.

Basic processing steps executed by such an index processor are illustrated in FIG. 5. As indicated by step 300, a one or more mark lists, are stored for a corpus of documents. The mark lists as mentioned above can be defined based on linguistic analysis and contextual analysis for each language and document type subject of the index processor. Alternatively, the mark lists can be generated by analysis of the corpus of documents. Also, a combination of linguistic analysis and document analysis may be applied for generation of the mark list. In the illustrated example, the index processor parses each document (DOCUMENT (i)) to form a document dictionary D(i) (block 301). Next, entries including coalesced tokens for marks as described above are added to the document dictionary D(i) (block 302). In some embodiments, marks may represented by tokens without coalescing the mark with a prefix of the marked word. The dictionary D for the corpus is updated by the union of the set of words in the corpus dictionary D with the set of words in the document dictionary D(i) (block 303). The set of words in the corpus dictionary D can be an empty set at the beginning of an analysis, or may comprise a large number of words determined from analysis of previous documents. The index processor then generates, or updates in the case of adding documents to an existing document dictionary, a reverse index on the dictionary defining the frequency and location of the words corresponding to the entries in the corpus dictionary D (block 304). The processor then determines whether there are more documents to be analyzed (block 305). If there are more documents, then the process loops to step 301, and parses and analyzes the next document. If there are no more documents for analysis at step 305, the indexing processor stops (block 306). It will be appreciated that the order and grouping of the execution of the processing steps shown in FIG. 5 can be rearranged according to the needs of particular implementation.

The basic indexing procedure corresponding with steps 301 and 302 can be understood with reference to the following pseudo-code:

```
Indexing (Document D)
{
        FOR EACH word W in Document D
        {
            IF (W is a stopword) THEN
            {
                    Read first character of word W+1 into C
                    Artificial Word W' = Concatenate W and C
                    Store W' in index structure
                            Store W in index structure
            } ELSE
                            {
                    Store W in index structure
                            }
        }
}
```

The above pseudo-code describes a process that operates on words parsed from a document. For each word W, the process determines whether the word is found in the stopword list. If the word is a stopword, then the first character of the following word (W+1) is stored as parameter C. Then, the artificial word W' is created by concatenating the word W with C. The token representing the artificial word W' is then stored in the index structure. Next, the token representing the word W is also stored in the index structure. Not stated in the pseudo-code is a step of associating with the index structure, the token representing the artificial word W' with the location of the corresponding stopword W. The location information is associated with words and artificial words using data structures which are part of the index structure, and can be general, such as a document identifier in which the corresponding stopword W is found, or can be more specific, such as a specific word position in a specific line within a specific document. The format of data structure used in the index structure to associate the location information with the corresponding stopword W, and with the artificial word W', association can take many styles known in the computer programming art.

The pseudo-code above is applied to stopword coalescing. The code is modified for mark coalescing in a straightforward manner, as follows:

```
Indexing (Document D)
{
        FOR EACH word W in Document D
        {
            IF (W is a contextual match on mark M) THEN
            {
                    Read first character of word W+1 into C
                    Artificial Word W* = Concatenate M
                    and C
                    Store W* in index structure
                            Store W in index structure
            }
            ELSE
                            {
                    Store W in index structure
            }
        }
}
```

Again location information that specifies the location of the marked word W is associated with the token representing the mark W* in the index structure in the manner discussed above with respect to stopwords.

A query processor in the search engine which comprises data sets, such as mark lists, data structures such as reverse index structures, and computer instructions executable by a processing unit, analyzes a query and generates a modified query if the phrase query includes a stopword or a contextual parameter, and then executes the modified query and returns results.

Figure 6:
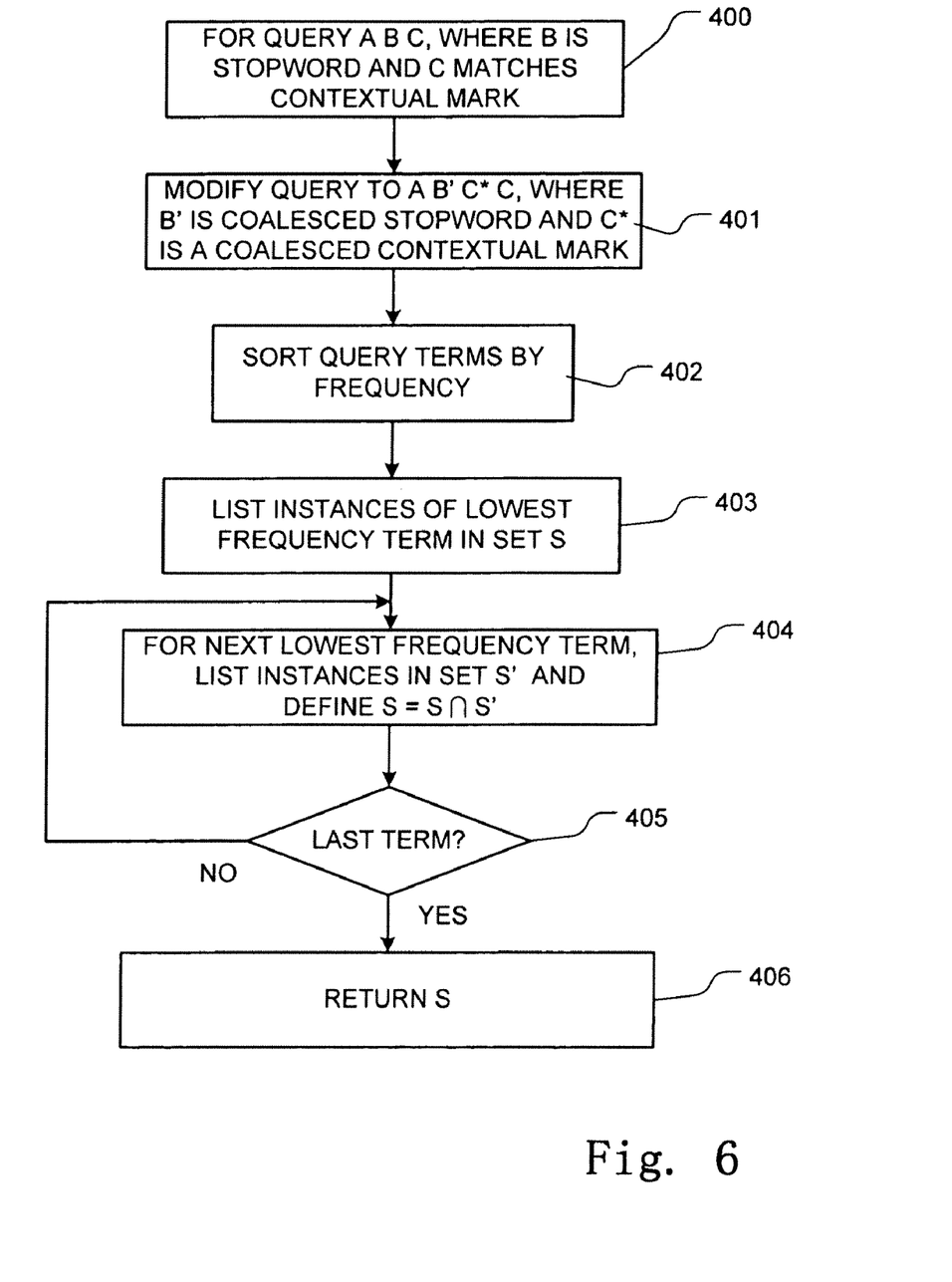
FIG. 6 is a simplified flow chart for a query processor.

Basic processing steps executed by such a query processor are illustrated in FIG. 6. The query processor begins with an input phrase query "A B C", where for this example the word B is a stopword and C is a contextual match on mark M (block 400). Next, the query is modified to the form "A B' C* C" where the term B' represents a coalesced stopword mark and C* represents the coalesced context mark, as described above (block 401). The query processor may then sort the query terms by frequency in the document corpus based on analysis of the dictionary (block 402). Next, instances of the lowest frequency term in the corpus are listed in a set of instances S (block 403). Then for a next term in the query, instances in the corpus are listed in a set S', and the lists are merged, so that the set of instances S is defined as the intersection of the set S and the set S' (block 404). The processor then determines whether the last term in a query has been processed (block 405). If there are additional terms in the query to be processed, then the processor loops back to block 404 where a list of instances for the next term is generated and merged with the set S. If at block 405 there are no more terms to be analyzed in the query, then the set S is returned as the result of the query (block 406).

At query time, if the phrase query contains stopwords, the query is preprocessed and the stopwords are converted into their corresponding stopword marks, corresponding with blocks 400 and 401 of FIG. 6. This process can be understood with reference to the following pseudo-code:

```
Process Query (Phrase Query Q)
{
    IF (Q contains stopwords) THEN
    {
        FOR EACH stopword W IN Q
        {
            Read first character of word W+1 into C
            Artificial Word W' = Concatenate W and C
            Replace W with W' in Q
        }
    }
    Process Phrase Query (Q) }
}
```

The above query processing pseudo-code describes a process which operates on queries received by the search engine. For each query Q, the process determines whether it contains a stopword. If it contains a stopword, then for each stopword W in the query Q, the first character of the next word W+1 in the query is stored as a parameter C. Then, an artificial word W' is created by concatenating W with the parameter C. The artificial word W' is used in the query in place of the stopword W. Alternatively, entries for both the artificial word W' and the stopword W may be kept in the query. Finally, the query as modified is processed.

The pseudo-code above is applied to phrase modification for stopword mark coalescing. The code is modified phrase modification for context mark coalescing in a 20 straightforward manner, as follows:

```
Process Query (Phrase Query Q)
{
    IF (Q contains contextual match on mark M) THEN
    {
        FOR EACH contextual match W on mark M in Q
        {
            Read first character of word W+1 into C
            Artificial Word W* = Concatenate M and C
            Add W* into Q
        }
    }
    Process Phrase Query (Q)
}
```

Technology described above comprises the following computer implemented components:
1. A list of all marks identified by the system.
2. An algorithm during indexing that create entries in the index with tokens made by coalescing marks with the first characters of the marked or adjacent words.
3. An algorithm at query time, for phrase queries only, that checks if any marks are contained in the query. If yes, stopword marks are changed to the corresponding artificial words, and for context marks the corresponding artificial words are added to the query, and the query is executed normally.
4. Processes for returning results correctly.

The invention consists of a mechanism for significantly speeding up phrase queries involving frequently occurring words in a search engine. The describe solution creates tokens for the index and for queries by coalescing marks in a novel way that significantly speeds up evaluation of phrase queries containing stopwords and marks, while simultaneously reducing the number of unique words.

The technique described in this application supports a variety of useful advanced querying features for contextual matching. For an additional example, the input stream may look like the following based on using a named entity extractor as a preprocessor:

{entity_person Bush} grew up in {entity_city Edison}

The individual tokens, including words (like "Bush") and marks (like "entity_person"), ignoring the braces, are then indexed. The marks would likely be distributed in the corpus like stopwords in that they would be extremely frequent in the input stream and so can be treated similarly, by for example coalescing the mark with the prefix of the marked word. A search for Bush as a person can be then be treated as search for the phrase "entity_person B Bush" and receive the same treatment as other phrase searches.

In particular, the input token stream can be transformed into the following stream and indexed:

entity_person_B Bush grew up in entity_city_E Edison

This would allow searching for Bush where Bush is person and for Edison where Edison is a city, using the following transformed query terms:

entity_person_B Bush
entity_city_E Edison

The various optimizations related to the number of prefix characters in the actual word and to adapting automatically to the best number of and even a variable number of prefix characters can be applied. In some cases, the value of doing adaptive and variable length prefixes may be even greater than for some categories of marks than with stopword containing phrase searches.

The generalized technique can be applied to a variety of features or attributes or properties of the words or their surrounding context. Besides associating words with entity types as in the above example, marks can be used to capture other linguistic properties including noun case or verb tense.

e.g. The {subject man} kicked the {object ball}

In this case, the phrases can be transformed for example to the following form:

The subject_m man kicked the {object_b ball}

Another application is to use tags to indicate special fielded data in the same 20 stream. Note in this example the stopword treatment is happening in combination with mark associations.

e.g. {title The Man of La Mancha}
title_T TheM title_M Man title_o ofL title L La title_M Mancha The marking procedure can be applied to generate multiple marks per word, which can address words and stopwords that meet more than one type of contextual match. For example, for a book entitled "The Life of Lyndon Johnson", the index processor, depending on the querying features being optimized, can create some or all of the following tokens to be used as entries in the index:

TheL
title_TheL
title_The
The
title_Life
Life
ofL
title_ofL
title_o
of
name_Lyndon Johnson
title_L
title_Lyndon
name_L
Lyndon
title_J
title Johnson
name_J
Johnson This technique enables uniform treatment of a number of features including supporting a wide range of linguistically sophisticated queries. The benefit to the implementation is that the need to create secondary indexes for auxiliary features of the text is obviated. Essentially this technique intelligently distributes tags across the buckets of a single index.

We have obviated the need for a secondary index by smartly distributing the 'primary index' buckets.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. An article of manufacture for use with a data processor for finding information in a corpus of documents, comprising:
    a non-transitory machine readable data storage medium including executable instructions to:
    identify selected words in the corpus of documents;
    for a designated selected word, form a contextual derivation of the selected word including a contextual term associated with the selected word and a character from the selected word;
    define a dictionary including stopwords, unique words and a contextual derivation associated with the corpus of documents;
    form a contextual derivation query from a character of a marked word in a query and a contextual term associated with the marked word; and
    apply the contextual derivation query to the dictionary to identify a match.

2. The article of manufacture of claim 1 further comprising executable instructions to locate a pointer associated with the match.

3. The article of manufacture of claim 2 further comprising executable instructions to follow the pointer to an inverted index.

4. The article of manufacture of claim 3 further comprising executable instructions to process document identification information and word location information in the inverted index.

5. The article of manufacture of claim 4 further comprising executable instructions to supply documents responsive to the query.

6. The article of manufacture of claim 5 further comprising executable instructions to supply word location information in documents responsive to the query.

7. The article of manufacture of claim 1 wherein the contextual derivation includes N leading characters of the selected word.

8. The article of manufacture of claim 7 wherein N is 3 or less.

9. The article of manufacture of claim 7 wherein N is 1.

10. The article of manufacture of claim 1 wherein a stopword is a special character.

11. The article of manufacture of claim 1 wherein the stopwords include: "the", "of", "and", "a", "is", and "in".

12. The article of manufacture of claim 1 wherein the dictionary includes an abnormal word including a stopword and a character of a word adjacent to the stopword.

13. The article of manufacture of claim 1 further comprising executable instructions to form a plurality of contextual derivations for the selected word.

14. A method for finding information in a corpus of documents, the method being implemented by one or more data processors and comprising:
    identifying, by at least one data processor, selected words in the corpus of documents;
    for a designated selected word, forming, by at least one data processor, a contextual derivation of the selected word including a contextual term associated with the selected word and a character from the selected word;
    defining, by at least one data processor, a dictionary including stopwords, unique words and a contextual derivation associated with the corpus of documents;
    forming, by at least one data processor, a contextual derivation query from a character of a marked word in a query and a contextual term associated with the marked word; and
    applying, by at least one data processor, the contextual derivation query to the dictionary to identify a match.

15. The method of claim 14 further comprising:
    locating, by at least one data processor, a pointer associated with the match,
    following, by at least one data processor, the pointer to an inverted index;
    processing, by at least one data processor, document identification information and word location information in the inverted index.

16. The method of claim 15 further comprising: supplying, by at least one data processor, documents responsive to the query.

17. The method of claim 16 further comprising: supplying, by at least one data processor, word location information in documents responsive to the query.

18. The method of manufacture of claim 14, wherein the contextual derivation includes N leading characters of the selected word.

19. The method of manufacture of claim 14 wherein a stopword is a special character.

20. The method of manufacture of claim 14 further comprising forming, by at least one data processor, a plurality of contextual derivations for the selected word.

21. An apparatus for finding information in a corpus of documents comprising:

at least one data processor; and memory coupled to the at least one data processor, the memory storing instructions, which when executed, cause the at least one data processor to:

identify selected words in the corpus of documents;

for a designated selected word, form a contextual derivation of the selected word including a contextual term associated with the selected word and a character from the selected word;

define a dictionary including stopwords, unique words and a contextual derivation associated with the corpus of documents;

form a contextual derivation query from a character of a marked word in a query and a contextual term associated with the marked word; and apply the contextual derivation query to the dictionary to identify a match.

* * * * *